(12) United States Patent
Park et al.

(10) Patent No.: US 9,727,898 B2
(45) Date of Patent: Aug. 8, 2017

(54) SYSTEM AND METHOD FOR MANAGING BATTERY DISCHARGE DURING CRITICAL PEAK PRICING INTERVALS

(71) Applicant: Sharp ELECTRONICS CORPORATION, Mahwah, NJ (US)

(72) Inventors: Daniel Park, Beaverton, OR (US); Carl Mansfield, Camas, WA (US); Kirk Stokes, Camas, WA (US); Van Wanless, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 384 days.

(21) Appl. No.: 14/604,432

(22) Filed: Jan. 23, 2015

(65) Prior Publication Data

US 2016/0036247 A1 Feb. 4, 2016

Related U.S. Application Data

(63) Continuation-in-part of application No. 14/446,092, filed on Jul. 29, 2014.

(51) Int. Cl.
*G06Q 30/04* (2012.01)
*H02J 7/00* (2006.01)
*H02J 3/32* (2006.01)
*H02J 3/00* (2006.01)

(52) U.S. Cl.
CPC ............... *G06Q 30/04* (2013.01); *H02J 3/32* (2013.01); *H02J 7/0065* (2013.01); *H02J 2003/007* (2013.01); *Y02E 60/76* (2013.01); *Y04S 40/22* (2013.01); *Y04S 50/12* (2013.01)

(58) Field of Classification Search
CPC .................................. G06Q 30/04; H01J 3/32

USPC .......................................................... 307/52
See application file for complete search history.

(56) References Cited

U.S. PATENT DOCUMENTS

| 8,019,697 B2* | 9/2011 | Ozog ............... G06Q 10/06315 705/400 |
| 8,359,124 B2 | 1/2013 | Zhou et al. |
| 2011/0099111 A1 | 4/2011 | Levy et al. |

(Continued)

OTHER PUBLICATIONS

Three California Utilities' Approaches to Critical Peak pricing and Capacity Reservation, Joule Assets, www.jouleassets.com.

*Primary Examiner* — Joseph Chang
(74) *Attorney, Agent, or Firm* — Law Office of Gerald Maliszewski; Gerald Maliszewski

(57) ABSTRACT

A system and method are provided for managing battery discharge during critical peak pricing (CPP) intervals. The method provides an alternating current (AC) client with a fluctuating AC grid demand, and a direct current (DC)-to-AC inverter having an input connected to a battery and selectable inversion power output levels connected to the AC client. In response to receiving a CPP warning for a first time interval, a present battery capacity state of charge (SoC) is determined. Also determined is a target peak demand for the AC client over a second time interval that includes the first time interval. The target peak demand defines a desired maximum threshold AC grid demand. In response to determining the present battery capacity SoC and the target peak demand, excess battery capacity is determined, and the excess battery capacity is used to supply auxiliary energy to the AC client during the CPP first time interval.

18 Claims, 5 Drawing Sheets

(56) References Cited

U.S. PATENT DOCUMENTS

| | | | |
|---|---|---|---|
| 2011/0125337 A1* | 5/2011 | Zavadsky | G06F 1/263 700/291 |
| 2011/0204720 A1 | 8/2011 | Ruiz et al. | |
| 2011/0282513 A1 | 11/2011 | Son et al. | |
| 2012/0005126 A1 | 1/2012 | Oh et al. | |
| 2013/0346139 A1* | 12/2013 | Steven | G06Q 10/06314 705/7.24 |
| 2014/0005852 A1 | 1/2014 | Asghari et al. | |

* cited by examiner

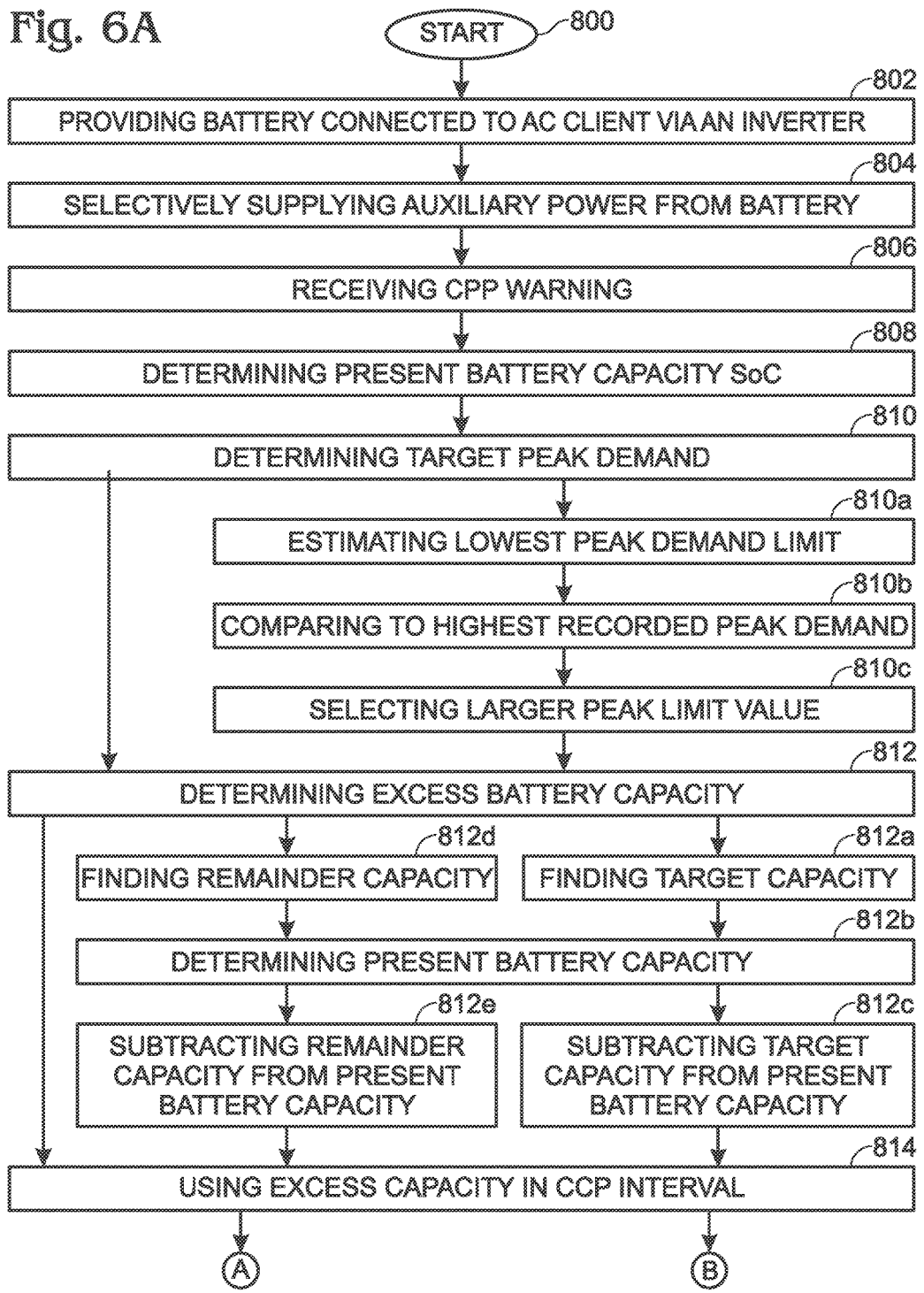

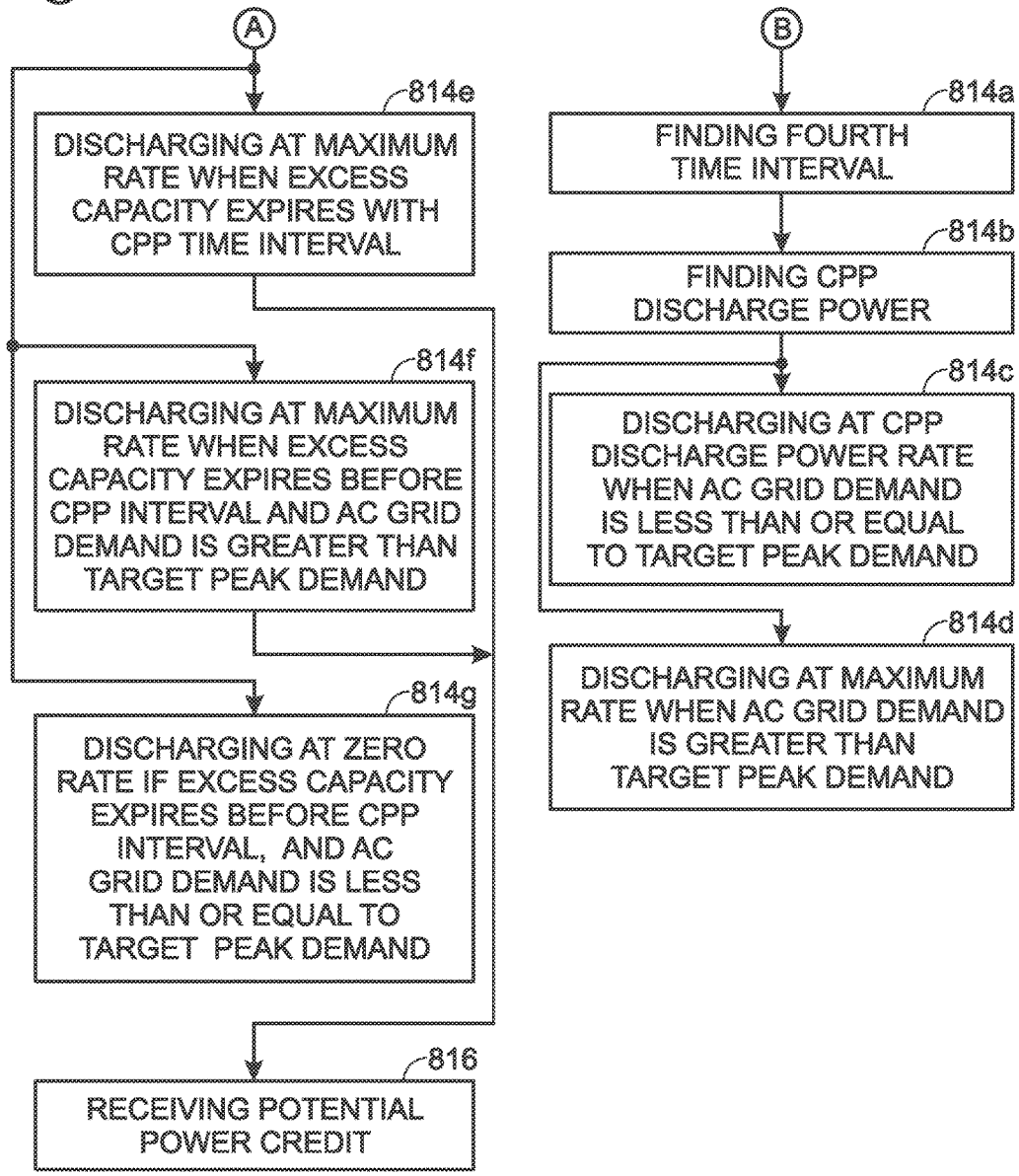

SYSTEM AND METHOD FOR MANAGING BATTERY DISCHARGE DURING CRITICAL PEAK PRICING INTERVALS

RELATED APPLICATIONS

This application is a Continuation-in-part of an application entitled, SYSTEM AND METHOD FOR MANAGING AC POWER USING AUXILIARY DC-TO-AC INVERSION, invented by Daniel Park, Ser. No. 14/446,092, Jul. 29, 2014, which is incorporated herein by reference.

BACKGROUND OF THE INVENTION

1. Field of the Invention

This invention generally relates to direct current (DC)-to-alternating current (AC) power inversion and, more particularly, to a system and method for efficiently managing to use of DC-to-AC power inversion during a critical peak pricing (CPP) period.

2. Description of the Related Art

When an electric utility declares a "Critical Peak Pricing (CPP)" period, the price of electricity may increase significantly (e.g., by more than a factor of 10). The normal practice of the rate payer is to reduce their electric consumption as much as practical. Often, a commercial entity may close down operations during these periods. If the customer (usually a commercial account) has a battery system designed to lower their peak energy demand, the battery system may discharge during the CPP interval to help reduce energy consumption.

The normal operation of a battery system performing a peak reduction operation is to monitor the electric energy used by the facility as measured by the "grid meter". The battery system will normally discharge the battery system onto the facilities electric system whenever the facility's electric load reaches a target limit. The reduction in the facility's monthly electric bill can be significantly reduced by the battery system maintaining the reduced peak electric load as compared to the peak electric load without the battery system.

It would be advantageous if a battery control mechanism existed that permitted the battery system to hold down the peak energy demand, as expressed in dollars per kilowatt, which has a separate expense rate than CPP, while using any excess battery capacity to reduce the energy consumption expenses during the CPP interval.

SUMMARY OF THE INVENTION

Disclosed herein are a system and method that cause a battery system connected a facility's alternating current (AC) electric supply to discharge stored electric energy towards the satisfaction of an electric grid demand, for the purpose of reducing the facility's energy consumption during a declared Critical Peak Pricing (CPP) interval. The use of the stored energy in the battery system is prioritized for peak energy demand reduction (kW reduction), with any remaining battery capacity used for the reduction of electric energy consumption. A CPP interval is a fixed time period in a day, and the price of electric energy during that period is expensive compared to other hours of the day. A CPP period is normally announced by the electric utility no later than 1 day in advance.

Accordingly, a method is provided for managing battery discharge during CPP intervals. The method provides an AC client with a fluctuating AC grid demand, and a direct current (DC)-to-AC inverter having an input connected to a battery and selectable inversion power output levels connected to the AC client. Auxiliary power is selectively supplied from the DC-to-AC inverter to at least partially satisfy the AC grid demand. In response to receiving a CPP warning for a first time interval, a present battery capacity state of charge (SoC) is determined. Also determined is a target peak demand for the AC client over a second time interval that begins with the start of the first time interval. The target peak demand defines a desired maximum threshold AC grid demand. In response to determining the present battery capacity SoC and the target peak demand, excess battery capacity is determined, and the excess battery capacity is used to supply auxiliary energy to the AC client during the CPP first time interval.

In one aspect, the excess battery capacity is found by determining the battery capacity required to satisfy the target peak demand for a remaining portion of the second time interval, to find a target capacity. The full battery capacity is multiplied by the present battery capacity SoC to determine a present battery capacity, and the target capacity is subtracted from the present battery capacity to find the excess battery capacity. The battery rate of discharge is calculated during the CPP first time interval, as follows. In the CPP first time interval, a third time interval value is associated with the time the DC-to-AC inverter supplies a maximum battery rate of discharge to maintain the target peak demand. This third time interval value is subtracted from the time remaining in the CPP first time interval, to find a fourth time interval value. The excess battery capacity is divided by the fourth time interval value to find a CPP discharge power. The CPP discharge power is used when the AC grid demand is less than or equal to the target peak demand. Otherwise, the maximum battery rate of discharge is used when the AC grid demand is greater than the target peak demand.

In another aspect, the excess battery capacity is found by determining the battery capacity required to satisfy the target peak demand for a remaining portion of the second time interval subsequent to the end of the first time interval, to find a remainder capacity. As above, the full battery capacity is multiplied by the present capacity SoC to determine a present battery capacity, but in this case the remainder capacity is subtracted from the present battery capacity to find the excess capacity. Then, the maximum battery rate of discharge is used when the excess capacity expires by the end of the first time interval, or after. Alternatively, the maximum battery rate of discharge is used when the excess capacity is determined to expire before the end of the first time interval, but the AC grid demand is greater than the target peak demand.

Additional details of the above-described method, and a system for managing battery discharge during CPP intervals, are provided below.

BRIEF DESCRIPTION OF THE DRAWINGS

FIG. 3 is a diagram depicting the establishment of a target peak demand.

FIGS. 6A and 6B are flowcharts illustrating a method for managing battery discharge during CPP intervals.

DETAILED DESCRIPTION

Figure 1:
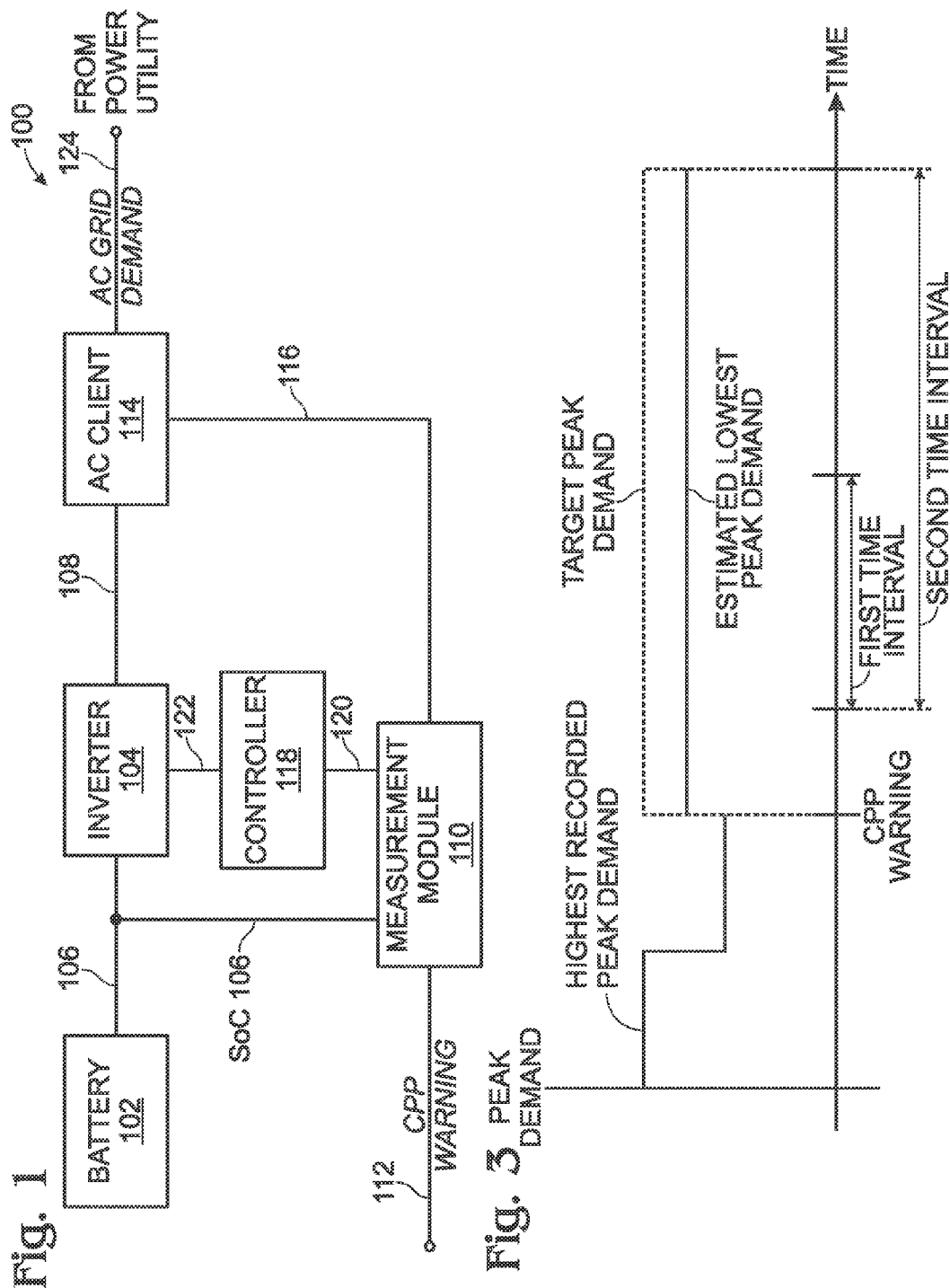
FIG. 1 is a schematic block diagram depicting a system for managing battery discharge during critical peak pricing (CPP) intervals.

FIG. 1 is a schematic block diagram depicting a system for managing battery discharge during critical peak pricing (CPP) intervals. The system 100 comprises a battery 102 to supply auxiliary power. A direct current-to-alternating current (DC-to-AC) inverter 104 has an input connected to a battery on line 106, and selectable inversion power output levels connected to an AC client 114 on line 108 to supply auxiliary power. A measurement module 110 has an interface on line 112 to receive a CPP warning for a first interval of time, and an interface connected to the battery on line 106 to determine a present battery capacity state of charge (SoC). The measurement module 110 has an interface connected to the AC client on line 116 to determine a target peak demand for the AC client over a second time interval that begins at the start of the first time interval. For example, the second interval may be a 24-hour day and the first time interval may the first hour in that day. The target peak demand defines a desired maximum threshold AC grid demand. A controller 118 has an interface to receive an excess battery capacity determination from the measurement module on line 120 that is responsive to the target peak demand and the present battery capacity SoC. The controller 118 has an interface connected to the DC-to-AC inverter on line 122 to command the supply of the determined excess battery capacity during the CPP first time interval.

Figure 2:
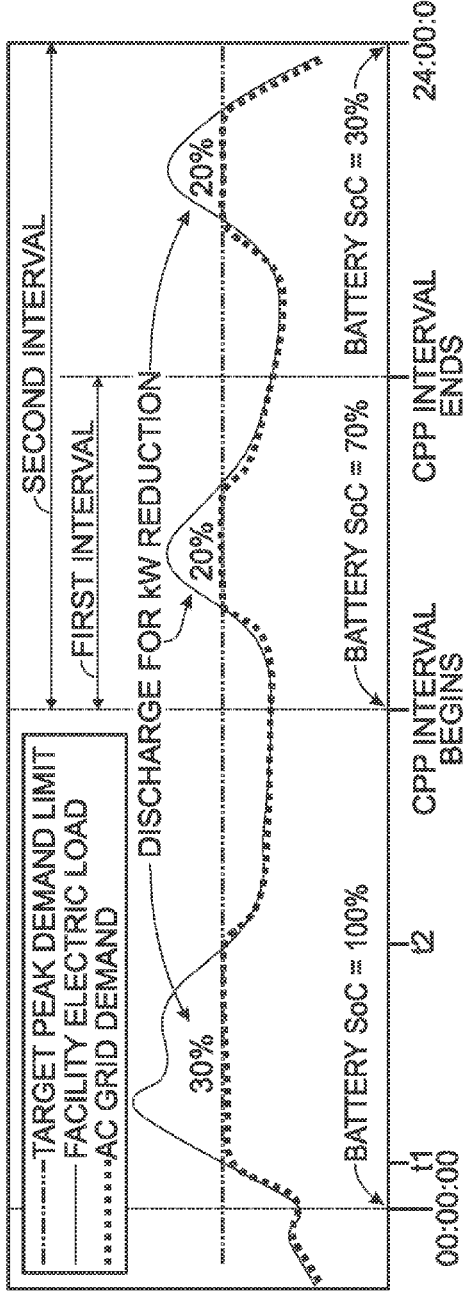
FIG. 2 is a diagram depicting peak demand with respect to the first and second time intervals.

FIG. 2 is a diagram depicting peak demand with respect to the first and second time intervals. As used herein, the "peak demand" or "peak demand rate" is the average demand over a period. The period is typically 15 minutes but may be reduced to 5 minutes by the electric utility. Typically, the actual recorded 15 minute demand is at the top of the hour (:00), 15 minutes after the hour (:15), 30 minutes after the hour (:30), and 45 minutes after the hour (:45). The same goes for 5 minute averages (:00), (:05), (:10) . . . . As used herein, "demand" is short for "AC grid demand", which is the power supplied to the AC client from the power utility.

A CPP interval is a fixed time period in a day, and the price of electric energy during that period is expensive compared to other hours of the day. A CPP period is normally announced by the electric utility no later than 1 day in advance. The normal operation of a battery system performing a peak reduction operation is to monitor the electric energy used by the facility as measured by the "grid meter". The battery system will normally discharge the battery system onto the facilities electric system whenever the facility's electric load reaches a target limit. The reduction in the facility's monthly electric bill can be significantly reduced by the battery system maintaining the reduced peak electric load as compared to the peak electric load without the battery system.

In FIG. 2, the AC grid demand is initially less than the peak demand limit, and no battery power is used. At time t1 the AC grid demand exceeds the peak demand limit and 30% of the battery capacity is discharged between times t1 and t2 to keep the AC grid demand below the peak demand limit. At the beginning of the CPP first interval, the AC grid demand is less than the peak demand limit and the battery is at a 70% SoC. It would be advantageous to discharge battery energy during the CPP interval, since utility energy is more expensive at this time. However, it is even more important that the battery be able to support the peak demand limit for the duration of the second time interval. For this reason, the battery is only engaged in the CPP first interval to keep the AC grid demand from exceeding the peak demand limit. Methods are described below that permit the battery to support a peak demand limit while using any existing excess capacity to satisfy AC client demands in the CPP first interval.

FIG. 3 is a diagram depicting the establishment of a target peak demand. To determine excess battery capacity, the target peak demand is first calculated. In one simple aspect, the measurement module 110 determines the target peak demand by computing an estimated lowest peak demand limit that is possible over the remaining second time interval based upon the present battery capacity SoC. Alternatively stated, the estimated lowest peak demand limit is the peak demand that can be satisfied using the battery for the remainder of the second interval. Obviously, this determination must be based upon an estimate of the peak demand for the remainder of the second interval. The measurement module may estimate the lowest peak demand limit based upon a consideration of current, predictive, and historical data that may include past and present power usage, as well as past, present, and future weather forecasts. The measurement module compares the estimated lowest peak demand limit to the highest peak demand that has already been recorded in a predetermined time interval, which may be the present utility billing period or the second time interval, to name a couple examples. The measurement module then selects the peak demand with the larger peak limit value as the target peak demand. In the example of FIG. 3, the recorded highest peak demand is greater than the estimated lowest peak demand limit, so it is chosen as the target peak demand.

Figure 4:
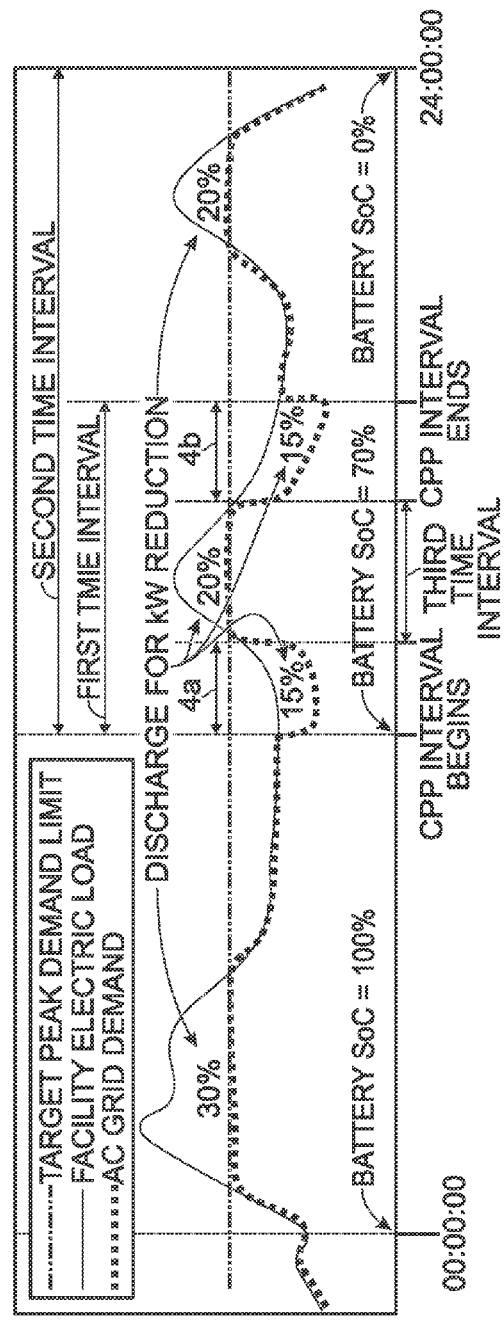
FIG. 4 is a diagram depicting a first method for the supply of excess battery capacity during the CPP first time interval.

FIG. 4 is a diagram depicting a first method for the supply of excess battery capacity during the CPP first time interval. The measurement module determines the battery capacity required to satisfy the target peak demand for a remaining portion of the second time interval, finding a target capacity. The measurement module multiplies the full battery capacity (the capacity of the battery when fully charged) by the present battery capacity SoC (marked as "Battery SoC") to determine a present battery capacity. Then, the target capacity is subtracted from the present battery capacity to find the excess battery capacity. For simplicity, the target peak demand is shown as a constant value and equal to the peak demand limit being used before the calculation of the target peak demand. In this example, the target capacity is 40% at the beginning of the CPP first time interval, and the excess battery capacity is 30%. This calculation changes as time progresses into the CPP first time interval, and periodic recalculations are typically performed to compensate for any errors.

The measurement module computes a battery rate of discharge during the CPP first time interval, as follows. In the CPP first time interval, a third time interval value is associated with the time the DC-to-AC inverter supplies a maximum battery rate of discharge to maintain the target peak demand. In this example, the third time interval is continuous, but it need not necessarily be so. The third time interval is subtracted from the time remaining in the CPP first time interval, to find a fourth time interval value. In this example, the battery rate of discharge is calculated at the start of the CPP first time interval, and the fourth time interval is shown as time interval 4a, prior to the third time interval, and time interval 4b, after the third time interval. The excess battery capacity is divided by the fourth time interval value to find a CPP discharge power.

Finally, the measurement module determines the excess battery capacity as the CPP discharge power when the AC grid demand is less than or equal to the target peak demand (as shown during the fourth time interval 4a and 4b). The maximum battery rate of discharge is used when the AC grid demand is greater than the target peak demand, as shown in the third time interval.

Figure 5:
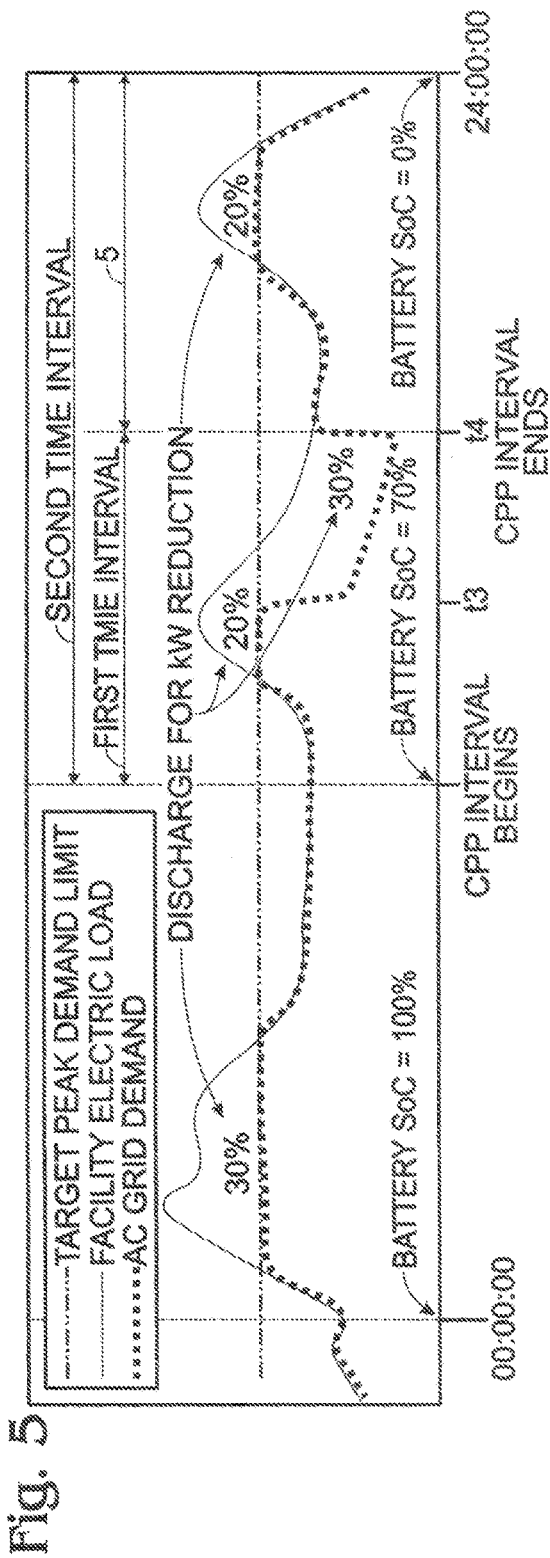
FIG. 5 is a diagram depicting a second method for the supply of excess battery capacity during the CPP first time interval.

FIG. 5 is a diagram depicting a second method for the supply of excess battery capacity during the CPP first time interval. In this aspect, the measurement module determines the battery capacity required to satisfy the target peak demand for a remaining portion of the second time interval subsequent to the end first time interval (marked as time interval 5), to find a remainder capacity. The measurement module multiplies the full battery capacity by the present battery capacity SoC to determine a present battery capacity, and then subtracts the remainder capacity from the present battery capacity to find the excess capacity. In this example, a 40% remainder capacity is calculated at the beginning of the CPP first time interval.

The memory module determines the maximum battery rate of discharge that is used when the excess capacity expires by the end of the first time interval, or after. Here, the maximum rate of discharge is used between times t3 and t4. The maximum battery rate of discharge is also used when the excess capacity is determined to expire before the end of the first time interval and the AC grid demand is greater than the target peak demand (not shown). Otherwise, the memory module determines a zero rate of battery discharge when the excess capacity is determined to expire before the end of the first time interval, and the AC grid demand is less than or equal to the target peak demand, also not shown.

When the controller commands the DC-to-AC controller to discharge at the maximum battery rate of discharge, between times t3 and t4, it is possible that power supplied to the AC client from the battery exceeds the AC grid demand. In that case, it is possible that the AC client may receive a power credit when the power discharged by the DC-to-AC inverter to the AC client exceeds the AC grid demand.

As described above, the battery system is informed of the CPP time interval. When this interval is entered, the battery system continues to maintain the electric demand peak limit but also discharges any excess battery capacity to the facility's electric system. One method by which the battery system knows how much "excess" battery capacity may be allocated to electric consumption reduction is as follows:

1) Periodically (e.g. each minute), the battery system estimates the electric demand profile for the facility (AC client). This estimate is based on historical usage patterns, the pattern observed thus far in the day, and other pertinent information such as the weather forecast.

2) The battery system then computes the lowest peak demand limit that is possible with the present battery capacity (SoC).

3) The target peak demand is the greater of the computed peak demand limit in the previous step verses the highest peak demand limit experience thus far in the billing period.

4) Given the target peak demand computed in the previous step, the system computes the required battery capacity to maintain that demand peak limit for the remainder of the day.

5) Given the battery capacity required as computed in the previous step, the system computes the excess battery capacity as expressed in kilowatt hours (kWh) that may be utilized for electric consumption reduction (excess_kWh).

6) Given the excess_kWh computed, the system computes the rate of discharge required to expend excess_kWh in the remaining time of the CPP interval. The computation is:

$$\text{CPP\_discharge\_power} = (\text{excess\_kWh})/(\text{time remaining in the CPP interval} - \text{time at full power for target peak demand maintenance}).$$

7) During the CPP interval, the battery system is then set to discharge at either:
  a. Full power as required to maintain the target peak demand, or
  b. CPP_discharge_power. However, this power value is overridden to a maximum power setting by the target peak demand maintenance function if the facility's load reaches the peak demand limit.

A potential disadvantage of the above-described method is that a large error in the load estimate may find the battery system with insufficient battery capacity to hold down the target peak demand at the end of the day. For example, the battery system may have incorrectly used the battery capacity for electric consumption reduction instead of for the primary purpose of peak demand reduction.

An alternative to steps 6 and 7, above, is to wait to as late into the CPP interval as possible and then discharge all of the battery capacity not required for the portion of the day (second time interval) after the CPP period.

4) Given the target peak demand computed in the previous step (Step 3), the system computes the required battery capacity to maintain that demand peak limit for the portion of the day after the end of the CPP interval.

5) Given the battery capacity required as computed in the previous step, the system computes the excess battery capacity that may be utilized for electric consumption reduction (excess_kWh).

6) Given the excess_kWh computed, the system determines if that capacity will be discharged in the remainder of the CPP interval when the discharge power is set to its maximum. Errors may cause the system to not be able to fully discharge the desired amount in the remaining time period, and an exemplary implementation may test against a time interval greater than or equal to the remainder of the CPP interval.
  a. If yes, then the discharge power is set to its maximum power setting.
  b. If no, then the discharge power is set to zero. However, this zero power value is overridden to a maximum power setting by the target peak demand maintenance function if the facility's load reaches the peak demand limit.

A potential disadvantage of this technique is that if the discharge of the battery system causes a reverse flow of electric energy into the electric grid, and the facility may not be given credit for the exported kWh.

Figure 7:
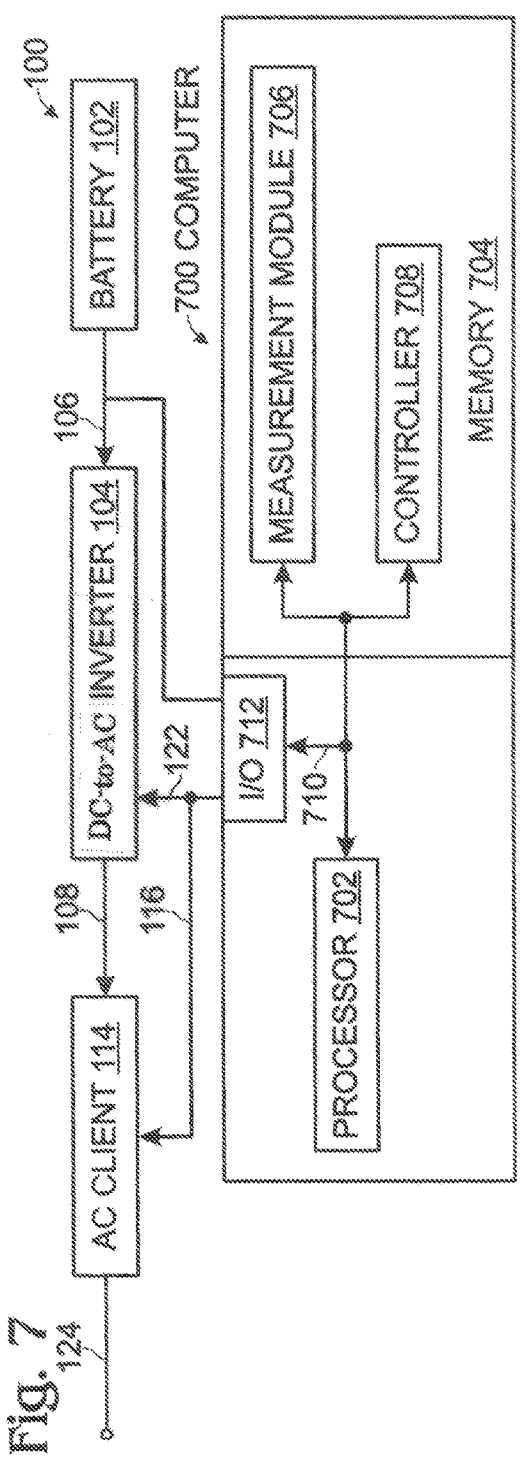
FIG. 7 is a schematic block diagram depicting the system of FIG. 1 with the measurement module and controller enabled as software applications.

FIG. 7 is a schematic block diagram depicting the system of FIG. 1 with the measurement module and controller enabled as software applications. In this aspect, the system 100 comprises a computer 700 with a processor 702, a non-transitory memory 704, a measurement module software application 706 and a controller software application 708. Software applications 706 and 708 are enabled as a sequence of processor-executable instructions stored in the non-transitory memory 704. A bus 710 couples the processor 702 and memory 704. The bus 710 is connected to an input/output (I/O) device 712 to enable communications on lines 116 and 122.

The non-transitory memory 704 may include a main memory, such as a random access memory (RAM) or other dynamic storage device, coupled to the bus 710 for storing information and instructions to be executed by a processor 702. The memory may include dynamic random access memory (DRAM) and high-speed cache memory. The memory 704 may also comprise a mass storage with one or more magnetic disk or tape drives or optical disk drives, for storing data and instructions for use by processor 702. For a workstation personal computer (PC) 700, for example, at least one mass storage system in the form of a disk drive or tape drive, may store the operating system and application software. The mass storage may also include one or more drives for various portable media, such as a floppy disk, a compact disc read only memory (CD-ROM), or an integrated circuit non-volatile memory adapter (i.e. PC-MCIA adapter) to input and output data and code to and from the processor 702. These memories may also be referred to as a computer-readable medium. The execution of the sequences of instructions contained in a computer-readable medium may cause a processor to perform some of the steps associated with power measurement and inverter output control. The practical implementation of such a computer system would be well known to one with skill in the art. Alternately, some of these functions may be performed using analog hardware or with state machine logic.

FIGS. 6A and 6B are flowcharts illustrating a method for managing battery discharge during CPP intervals. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps and describes the systems of FIGS. 1 and 7. The method starts at Step 800.

Step 802 provides an AC client with a fluctuating AC grid demand, and a DC-to-AC inverter having an input connected to a battery and selectable inversion power output levels connected to the AC client, see FIG. 1. Step 804 selectively supplies auxiliary power from the DC-to-AC inverter to at least partially satisfy the AC grid demand. Step 806 receives a CPP warning for a first time interval. Step 808 determines a present battery capacity SoC. Step 810 determines a target peak demand for the AC client over a second time interval that begins at the start of the first time interval, where a target peak demand defines a desired maximum threshold AC grid demand. In response to determining the present battery capacity SoC and the target peak demand, Step 812 determines excess battery capacity. Step 814 uses the excess battery capacity to supply auxiliary energy to the AC client during the CPP first time interval. That is, power (kW) is used to hold down the demand, and after satisfying the power requirements to protect the target peak demand limit, excess energy (kWh) can be used in the CPP time interval.

In one aspect, determining the target peak demand in Step 810 includes estimating a lowest peak demand limit that is possible over a remaining second time interval based upon the present battery capacity SoC. In another aspect, determining the target peak demand includes the following substeps. Step 810a estimates the lowest peak demand limit based upon a consideration of current, predictive, and historical data such as power usage and weather forecasts. Step 810b compares the estimated lowest peak demand limit to a highest peak demand recorded in a billing time interval. Step 810c selects the peak demand with a larger peak limit value as the target peak demand.

In a first variation, determining excess battery capacity in Step 812 includes the following substeps. Step 812a determines the battery capacity required to satisfy the target peak demand for a remaining portion of the second time interval, to find a target capacity. Step 812b multiplies the full battery capacity by the present battery capacity SoC to determine a present battery capacity. Step 812c subtracts the target capacity from the present battery capacity to find the excess battery capacity.

Using the excess battery capacity to supply auxiliary energy during the CPP first time interval in Step 814 includes computing a battery rate of discharge during the CPP first time interval using the following substeps. In the CPP first time interval, Step 814a subtracts a third time interval value associated with the time the DC-to-AC inverter supplies a maximum battery rate of discharge to maintain the target peak demand from the time remaining in the CPP first time interval, to find a fourth time interval value. Step 814b divides the excess battery capacity by the fourth time interval value to find a CPP discharge power. Step 814c discharges the battery at a rate of the CPP discharge power, when the AC grid demand is less than or equal to the target peak demand. Otherwise, Step 814d discharges the battery at the maximum battery rate of discharge, when the AC grid demand is greater than the target peak demand.

In a second variation, Step 812 determines excess battery capacity using the following substeps. Step 812d determines the battery capacity required to satisfy the target peak demand for a remaining portion of the second time interval subsequent to the end of first time interval, to find a remainder capacity. Step 812b multiplies the full battery capacity by the present capacity SoC to determine a present battery capacity. Step 812e subtracts the remainder capacity from the present battery capacity to find the excess capacity.

Using the excess battery capacity to supply auxiliary energy during the CPP first time interval in Step 814 includes the following substeps. Step 814e discharges at the maximum battery rate of discharge when the excess capacity expires by the end of the first time interval, or after. Step 814f discharges at the maximum battery rate of discharge when the excess capacity is determined to expire before the end of the first time interval, and the AC grid demand is greater than the target peak demand. Step 814g discharges at a zero rate of battery discharge when the excess capacity is determined to expire before the end of the first time interval, and the AC grid demand is less than or equal to the target peak demand.

In one aspect, in response to discharging at the maximum battery rate of discharge (Steps 814e or 814f), Step 816 receives a power credit when the power discharged from the battery exceeds the AC grid demand.

A system and method have been provided for managing battery discharge during a CPP time interval. Examples of particular process steps and trigger scenarios have been presented to illustrate the invention. However, the invention is not limited to merely these examples. Other variations and embodiments of the invention will occur to those skilled in the art.

We claim:

1. A method for managing battery discharge during critical peak pricing (CPP) intervals, the method comprising:

providing an alternating current (AC) client with a fluctuating AC grid demand, and a direct current (DC)-to-AC inverter having an input connected to a battery and selectable inversion power output levels connected to the AC client;
selectively supplying auxiliary power from the DC-to-AC inverter to at least partially satisfy the AC grid demand;
receiving a CPP warning for a first time interval;
determining a present battery capacity state of charge (SoC);
determining a target peak demand for the AC client over a second time interval that begins at a start of the first time interval, where a target peak demand defines a desired maximum threshold AC grid demand;
in response to determining the present battery capacity SoC and the target peak demand, determining excess battery capacity; and,
using the excess battery capacity to supply auxiliary energy to the AC client during the CPP first time interval.

2. The method of claim 1 wherein determining the target peak demand includes estimating a lowest peak demand limit that is possible over a remaining second time interval based upon the present battery capacity SoC.

3. The method of claim 2 wherein determining the target peak demand includes:
estimating the lowest peak demand limit based upon a consideration of current, predictive, and historical data selected from a group consisting of power usage and weather forecasts;
comparing the estimated lowest peak demand limit to a highest peak demand recorded in a present billing period; and,
selecting the peak demand with a larger peak limit value as the target peak demand.

4. The method of claim 1 wherein determining excess battery capacity includes:
determining the battery capacity required to satisfy the target peak demand for a remaining portion of the second time interval, to find a target capacity;
multiplying a full battery capacity by the present battery capacity SoC to determine a present battery capacity; and,
subtracting the target capacity from the present battery capacity to find the excess battery capacity.

5. The method of claim 4 wherein using the excess battery capacity to supply auxiliary energy during the CPP first time interval includes computing a battery rate of discharge during the CPP first time interval, as follows:
in the CPP first time interval, subtracting a third time interval value associated with the time the DC-to-AC inverter supplies a maximum battery rate of discharge to maintain the target peak demand from the time remaining in the CPP first time interval, to find a fourth time interval value; and,
dividing the excess battery capacity by the fourth time interval value to find a CPP discharge power.

6. The method of claim 5 wherein using the excess battery capacity to supply auxiliary energy during the CPP first time interval additionally includes discharging the battery at a rate of:
the CPP discharge power, when the AC grid demand is less than or equal to the target peak demand; and,
the maximum battery rate of discharge, when the AC grid demand is greater than the target peak demand.

7. The method of claim 1 wherein determining excess battery capacity includes:

determining the battery capacity required to satisfy the target peak demand for a remaining portion of the second time interval subsequent to the end of first time interval, to find a remainder capacity; and,
multiplying a full battery capacity by the present capacity SoC to determine a present battery capacity;
subtracting the remainder capacity from the present battery capacity to find the excess capacity.

8. The method of claim 7 wherein using the excess battery capacity to supply auxiliary energy during the CPP first time interval includes discharging at a maximum battery rate of discharge under conditions selected from a group consisting of:
when the excess capacity expires by the end of the first time interval, or after;
when the excess capacity is determined to expire before the end of the first time interval, and the AC grid demand is greater than the target peak demand; and,
discharging at a zero rate of battery discharge when the excess capacity is determined to expire before the end of the first time interval, and the AC grid demand is less than or equal to the target peak demand.

9. The method of claim 8 further comprising;
in response to discharging at the maximum battery rate of discharge, receiving a power credit when the power discharged from the battery exceeds the AC grid demand.

10. A system for managing battery discharge during critical peak pricing (CPP) intervals, the system comprising:
a battery to supply auxiliary power;
a direct current-to-alternating current (DC-to-AC) inverter having an input connected to a battery and selectable inversion power output levels connected to an AC client to supply auxiliary power;
a measurement module having an interface to receive a CPP warning for a first interval of time, an interface connected to the battery to determine a present battery capacity state of charge (SoC), and an interface connected to the AC client to determine a target peak demand for the AC client over a second time interval that begins at a start of the first time interval, where a target peak demand defines a desired maximum threshold AC grid demand; and,
a controller having an interface to receive an excess battery capacity determination from the measurement module, responsive to the target peak demand and the present battery capacity SoC, and an interface connected to the DC-to-AC inverter to command the supply of the determined excess battery capacity during the CPP first time interval.

11. The system of claim 10 wherein the measurement module determines the target peak demand by estimating a lowest peak demand limit that is possible over a remaining second time interval based upon the present battery capacity SoC.

12. The system of claim 11 wherein the measurement module estimates the lowest peak demand limit based upon a consideration of current, predictive, and historical data selected from a group consisting of power usage and weather forecasts, compares the estimated lowest peak demand limit to a highest peak demand recorded in a present billing period, and then selects the peak demand with a larger peak limit value as the target peak demand.

13. The system of claim 10 wherein the measurement module determines the battery capacity required to satisfy the target peak demand for a remaining portion of the second time interval, to find a target capacity, multiplies a full battery capacity by the present battery capacity SoC to determine a present battery capacity, and then subtracts the target capacity from the present battery capacity to find the excess battery capacity.

14. The system of claim 13 wherein the measurement module computes a battery rate of discharge during the CPP first time interval, as follows:
   in the CPP first time interval, subtracting a third time interval value associated with the time the DC-to-AC inverter supplies a maximum battery rate of discharge to maintain the target peak demand, from the time remaining in the CPP first time interval, to find a fourth time interval value; and,
   dividing the excess battery capacity by the fourth time interval value to find a CPP discharge power.

15. The system of claim 14 wherein the measurement module determines the excess battery capacity as the CPP discharge power when the AC grid demand is less than or equal to the target peak demand, and the maximum battery rate of discharge when the AC grid demand is greater than the target peak demand.

16. The system of claim 10 wherein the measurement module determines the battery capacity required to satisfy the target peak demand for a remaining portion of the second time interval subsequent to the end of the first time interval, to find a remainder capacity, multiplies a full battery capacity by the present battery capacity SoC to determine a present battery capacity, and then subtracts the remainder capacity from the present battery capacity to find the excess capacity.

17. The system of claim 16 wherein the memory module determines the maximum battery rate of discharge in a condition selected from a group consisting of when the excess capacity expires by the end of the first time interval, or after, and when the excess capacity is determined to expire before the end of the first time interval and the AC grid demand is greater than the target peak demand; and,
   wherein the memory module determines a zero rate of battery discharge when the excess capacity is determined to expire before the end of the first time interval, and the AC grid demand is less than or equal to the target peak demand.

18. The system of claim 17 wherein the controller commands the DC-to-AC controller to discharge at the maximum battery rate of discharge; and,
   wherein the AC client receives a power credit when the power discharged by the DC-to-AC inverter to the AC client exceeds the AC grid demand.

* * * * *